United States Patent
Aoyama et al.

(10) Patent No.: US 6,635,712 B1
(45) Date of Patent: Oct. 21, 2003

(54) MOLDING MATERIAL, PROCESS FOR PRODUCING MOLDED ARTICLE, AND MOLDED ARTICLE

(75) Inventors: Takuma Aoyama, Chiba-ken (JP); Akihiko Okada, Chiba-ken (JP)

(73) Assignee: Idemitsu Petrochemical Co., Ltd., Tokyo (JP)

(*) Notice: Subject to any disclaimer, the term of this patent is extended or adjusted under 35 U.S.C. 154(b) by 0 days.

(21) Appl. No.: 09/856,180

(22) PCT Filed: Oct. 4, 2000

(86) PCT No.: PCT/JP00/06899

§ 371 (c)(1),
(2), (4) Date: Jun. 5, 2001

(87) PCT Pub. No.: WO01/25329

PCT Pub. Date: Apr. 12, 2001

(30) Foreign Application Priority Data

Oct. 5, 1999 (JP) .............................. 11-284024
Apr. 6, 2000 (JP) ........................... 2000-104888

(51) Int. Cl.⁷ ..................... C08L 23/00; C08L 23/04; C08L 33/04; C08L 35/02; C08L 25/00
(52) U.S. Cl. ............... 525/191; 525/222; 525/232; 525/238; 525/240; 525/241
(58) Field of Search ........................... 525/191, 222, 525/232, 238, 240, 241

(56) References Cited

U.S. PATENT DOCUMENTS 5,698,652 A    12/1997  Aoyama et al.
6,005,050 A *  12/1999  Okada et al. .............. 525/191
6,169,146 B1    1/2001  Okada et al.

FOREIGN PATENT DOCUMENTS

JP    8-92444     4/1996
JP    8-143699    6/1996
JP    11-5236    1/1999

* cited by examiner

Primary Examiner—Nathan M. Nutter
(74) Attorney, Agent, or Firm—Oblon, Spivak, McClelland, Maier & Neustadt, P.C.

(57) ABSTRACT

There are disclosed a molding material which is used for molding a styrenic polymer and which is capable of affording moldings that are excellent in solvent resistance and mechanical strength even when produced at a molding temperature almost same as that of ordinary atactic polystyrene, namely at a resin temperature of 260° C. or lower, dispensing with a melt kneading step; a process for producing a molding by molding the above molding material, which process enables to shorten molding cycle time and curtail the producton cost; and the moldings produced thereby. The molding material comprises a dry blend of 10 to 95% by weight of a (A) styrenic polymer having atactic configuration and 2 to 90% by weight of a (B) styrenic polymer having a melting point of 250° C. or lower, a weight average molecular weight of at most 200,000 and mainly syndiotactic configuration.

3 Claims, No Drawings

MOLDING MATERIAL, PROCESS FOR PRODUCING MOLDED ARTICLE, AND MOLDED ARTICLE

TECHNICAL FIELD

The present invention relates to a molding material comprising a dry blend of a styrenic resin, a process for producing moldings using the molding material and the moldings produced thereby. More particularly, it is concerned with a molding material comprising a dry blend of a styrenic polymer having an atactic configuration and a styrenic polymer having a mainly syndiotactic configuration and specific physical properties; a process for producing moldings using the molding material; and the moldings produced thereby.

BACKGROUND ART

A styrenic polymer which has an atactic configuration hereinafter sometimes referred to as "atactic polystyrene") and which is produced by radical polymerization has heretofore been used for a variety of applications because of its availability at a low cost. However, the aforesaid atactic polystyrene, which is non-crystalline because of its atactic configuration in stereostructure, is not necessarily satisfactory in regard to solvent resistance, thus restricting its applicable field as a molding material. A resin composition of the atactic polystyrene and a polyphenylene ether blended therewith is known, but likewise it is not necessarily satisfactory in regard to solvent resistance.

In order to improve the solvent resistance, there has been adopted a method in which styrene is copolymerized with a polar monomer such as acrylonitrile, methacrylates, acrylates, maleic anhydride and maleimides. However, the copolymer thus obtained has involved such problems as random copolymerization ratio being limited, low productivity, unfavorable color tone, malodor and difficulty in recycling by mixing with an other styrenic resin.

It being so, as an alternative for non-crystalline atactic polystyrene, crystalline syndiotactic polystyrene was developed, and further, there are proposed resin compositions each comprising the syndiotactic polystyrene and other resin blended there with so as to improve heat resistance thereof {Japanese Patent Application Laid-Open Nos.104818/1987(Showa-62), 257948/1987 (Showa-62), 257950/1987(Showa-62), 182344/1989(Heisei-1), etc.}.

Nevertheless, the problems still remain unsolved in that in the case of producing a styrenic resin composition by blending the atactic polystyrene with the syndiotactic polystyrene, it is necessary to carry out melt kneading prior to the production of the composition by molding in order to sufficiently manifest such physical properties as solvent resistance and mechanical strength, and carry out molding working of the composition at a temperature higher than a molding working temperature of a conventional atactic polystyrene, thereby deteriorating the molding cycle and causing sinks at thick-walled portions.

DISCLOSURE OF THE INVENTION

In such circumstances; an object of the present invention is to provide a molding material which is capable of affording moldings that are excellent in solvent resistance and mechanical strength in the case of molding a styrenic polymer, even if molding working is carried out at a molding working temperature of a conventional atactic polystyrene, dispensing with a melt kneading step; a process of producing the moldings which use the aforesaid the molding material, and in which the molding cycle is shortened and the production cost is curtailed.

As a result of investigation accumulated by the present inventors in order to solve the foregoing problems involved in the prior arts, it has been found that it is made possible to obtain moldings excellent in various physical properties such as solvent resistance and mechanical strength, even if molding is carried out at a molding working temperature of a conventional atactic polystyrene, dispensing with a melt kneading step, by blending an atactic polystyrene with a syndiotactic polystyrene endowed with specific physical properties. The present invention has been accomplished by the aforesaid findings and information.

That is to say, the present invention is summarized as follows.

{1} A molding material which comprises a dry blend of 10 to 95% by weight of a (A) styrenic polymer having atactic configuration and 2 to 90% by weight of a (B) styrenic polymer which has a melting point of 250° C. or lower, a weight average molecular weight of at most 200,000 and mainly syndiotactic configuration.

{2} The molding material as defined in item {1} in which the styrenic polymer having mainly syndiotactic configuration as the component (B) has a melting point of 245° C. or lower, and is blended in an amount of 5 to 90% by weight.

{3} The molding material as defined in item {1} in which the styrenic polymer having mainly syndiotactic configuration as the component (B) has an initial relative crystallinity as measured with a differential scanning calorimeter being at most 60%.

{4} A process for producing a molding which comprises molding the molding material as defined in any of items {1} to {3} at a a resin temperature of 260° C. or lower.

{5} A molding which is produced by the process as defined in item {4}.

THE MOST PREFERRED EMBODIMENT TO CARRY OUT THE INVENTION

The present invention is constituted of a molding material which comprises a dry blend of 10 to 95% by weight of a (A) styrenic polymer having atactic configuration and 2 to 90% by weight of a (B) styrenic polymer having a melting point of 250° C. or lower, a weight average molecular weight of at most 200,000 and mainly syndiotactic configuration.

As the styrenic polymer having atactic configuration as the component (A) to be used in the present invention, use is made of an atactic polystyrene which is produced by any of solution polymerization, bulk polymerization, suspension polymerization and bulk-suspension polymerization. As a monomer to be used as a starting material for the atactic polystyrene, use is made of an aromatic vinyl compound represented by the general formula (1):

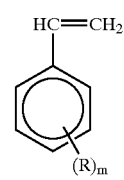

wherein R is independently of one another, is a substituent group having at least one atom selected from the group consisting of a halogen atom, carbon atom, oxygen atom, nitrogen atom, sulfur atom, phosphorus atom, selenium atom, silicon atom and tin atom; m is an integer of 1 to 3; and when m is plural, each R may be same or different. The atactic polystyrene may be a copolymer of the forgoing aromatic vinyl monomer and an other vinyl monomer copolymerizable with at least one aromatic vinyl monomer or rubbery polymer. Also, the atactic polystyrene may be a hydride of the polymer or the copolymer, or a mixture thereof.

Examples of the aromatic vinyl compound represented by the general formula (1) include styrene, α-methylstyrene, methylstyrene, ethylstyrene, isopropylstyrene, tert-butylstyrene, phenylstyrene, vinylstyrene, chlorostyrene, bromostyrene, fluorostyrene, chloromethylstyrene, methoxystyrene and ethoxystyrene. Of these are particularly preferable styrene, p-methylstyrene, m-methylstyrene, p-tert-butylstyrene, p-chlorostyrene, m-chlorostyrene and p-fluorostyrene. Any of those may be used alone or in combination with at least one other.

Examples of an other vinyl monomer copolymerizable with the aromatic vinyl compound include vinylcyanide compounds such as acrylonitrile and methacrylonitrile; acrylic esters such as methyl acrylate, ethyl acrylate, propyl acrylate, butyl acrylate, amyl acrylate, hexyl acrylate, octyl acrylate, 2-ethylhexyl acrylate, cyclohexyl acrylate, dodecyl acrylate, octadecyl acrylate, phenyl acrylate and benzyl acrylate; methacrylic esters such as methyl methacrylate, ethyl methacrylate, butyl methacrylate, amyl methacrylate, hexyl methacrylate, octyl methacrylate, 2-ethylhexyl methacrylate, cyclohexyl methacrylate, dodecyl methacrylate, octadecyl methacrylate, phenyl methacrylate and benzyl methacrylate; and maleimide based compounds such as maleimide, N-methyl maleimide, N-ethyl maleimide, N-butyl maleimide, N-lauryl maleimide, N-cyclohexyl maleimide, N-phenyl maleimide and N-(p-bromophenyl) maleimide.

Examples of rubbery polymers copolymerizable with the aromatic vinyl compound include polybutadiene, styrene-butadiene copolymer, acrylonitrile-butadiene copolymer, diene-based rubber such as polyisoprene, ethylene-α-olefin copolymer, ethylene-α-olefin-polyene copolymer, non-diene based rubber such as polyacrylic esters, styrene-butadiene block copolymer, hydrogenated styrene-butadiene block copolymer, ethylene-propylene elastomer, styrene-graft-ethylene-propylene elastomer, ethylenic ionomer resin and hydrogenated styrene-isoprene copolymer.

The molecular weight of the atactic polystyrene to be used as the foregoing component (A) is not specifically limited but is generally at least 10,000, preferably at least 50,000 expressed in terms of weight average molecular weight. The atactic polystyrene having a weight average molecular weight of less than 10,000 is unfavorable because of deteriorated thermal and mechanical properties of the molding produced therefrom. Likewise, the molecular weight distribution thereof is not specifically limited in its wideness and narrowness, but various molecular weight distributions are applicable thereto.

Moreover, in order to enhance the impact resistance of the moldings to be produced in the present invention, a rubbery elastomer may be used as part of and in combination with the component (A) according to the purpose. Specific examples of usable rubbery elastomer include natural rubber, polybutadiene, polyisoprene, polyisobutylene, neoprene, polysulfide rubber, thiokol rubber, acrylic rubber, urethane rubber, silicone rubber, epichlorohydrin rubber, styrene-butadiene block copolymer (SBR), hydrogenated styrene-butadiene block copolymer (SEB, SEBC), styrene-butadiene-styrene block copolymer (SBS) hydrogenated styrene-butadiene-styrene block copolymer (SEBS), styrene-isoprene block copolymer (SIR), hydrogenated styrene-isoprene block copolymer (SEP), styrene-isoprene-styrene block copolymer (SIS), hydrogenated styrene-isoprene-styrene block copolymer (SEPS), ethylene-propylene rubber (EPM), ethylene-propylene diene rubber (EPDM), core shell type granular elastomer such as butadiene-acrylonitrile-styrene-core shell rubber (ABS), methyl methacrylate-butadiene-styrene-core shell rubber (MBS), methyl methacrylate-butyl acrylate-styrene-core shell rubber (MAS), octyl acrylate-butadiene-styrene-core shell rubber (MABS), alkyl acrylate-butadiene-acrylonitrile-styrene-core shell rubber (AABS), butadiene-styrene-core shell rubber (SBR), siloxane-containing core shell rubber typified by methyl methacrylate-butyl acrylate-siloxane and rubber formed by modifying any of the foregoing rubber. Of these are particularly preferably used SBR, SEB, SEBS, SIR, SEP, SIS, SEPS, core shell rubber, EPM, EPDM and rubber formed by modifying any of the rubber just mentioned. Any of the above-exemplified rubbery elastomers may be used alone or in combination with at least one other.

The blending proportion of the rubbery elastomers to be used as part of the component (A) is at most 80%, preferably at most 60%, more preferably at most 50% each by weight, since a blending proportion of more than 80% by weight sometimes causes deterioration in solvent resistance and modulus of elasticity.

Further, in order to enhance the heat resistance of the molding material in the present invention, polyphenylene ether may be blended as part of the component (A). The polyphenylene ether to be used is preferably any of those as described in U.S. Pat. Nos. 3,306,874, 3,306,875, 3,257,357 and 3,257,358. The aforesaid polyphenylene ether is prepared by oxidation coupling reaction in which a phenolic compound having at least one substituent group is made into a homopolymer or copolymer in the presence of a copper amine complex. Preferably usable copper amine complex is that derived from a primary amine, a secondary amine or a tertiary amine.

Examples of the polyphenylene ether suitable for use as part of the component (A) include poly(2,3-dimethyl-6-ethyl-1,4-phenylene ether), poly(2-methyl-6-chloromethyl-1,4-phenylene ether), poly(2-methyl-6-hydroxyethyl-1,4-phenylene ether), poly(2-methyl-6-n-butyl-1,4-phenylene ether), poly(2-ethyl-6-isopropyl-1,4-phenylene ether), poly(2-ethyl-6-n-propyl-1,4-phenylene ether), poly(2,3,6-trimethyl-1,4-phenylene ether), poly{2-(4'-methylphenyl)-1,4-phenylene ether}, poly(2-bromo-6-phenyl-1,4-phenylene ether), poly(2-phenyl-1,4-phenylene ether), poly(2-chloro-1,4-phenylene ether), poly(2-methyl-1,4-phenylene ether), poly(2-chloro-6-ethyl-1,4-phenylene ether), poly(2-chloro-6-bromo-1,4-phenylene ether), poly(2,6-di-n-propyl-1,4-phenylene ether), poly(2-methyl-6-isopropyl-1,4-phenylene ether), poly(2-chloro-6-methyl-1,4-phenylene ether), poly(2-methyl-6-ethyl-1,4-phenylene ether), poly(2,6-dibromo-1,4-phenylene ether), poly(2,6-dichloro-1,4-phenylene ether), poly(2,6-diethyl-1,4-phenylene ether) and poly(2,6-dimethyl-1,4-phenylene ether). Of these, poly(2,6-dimethyl-1,4-phenylene ether) is particularly preferable.

Moreover, there may be used not only a homopolymer of a phenolic compound but also a copolymer of two or more thereof. Further, the homopolymer and copolymer may be modified with a modifying agent such as maleic anhydride or fumaric acid. Also there may be used a graft copolymer or block copolymer of an aromatic compound such as styrene and any of the foregoing polyphenylene ether.

The molecular weight as expressed in terms of intrinsic viscosity in chloroform at 25° C. of the polyphenylene ether to be used there is preferably at most 0.5 deciliter, more preferably at most 0.45 deciliter. The reason is that polyphenylene ether having an intrinsic viscosity of more than 0.5 deciliter, when blended therein, sometimes brings about lowered fluidity of the molding material at the time of molding.

The blending proportion of the polyphenylene ether as part of the component (A) is in the range of 5 to 80% by weight, preferably 10 to 60% by weight based on the total weight of the component (A). The blending proportion thereof, when being less than 5% by weight, leads to insufficient effect on enhancing the heat resistance, whereas the blending proportion thereof, when being more than 80% by weight, some times brings about deteriorated fluidity of the molding material at the time of molding.

Next, the syndiotactic configuration in a styrenic polymer having mainly syndiotactic configuration means that its stereo-structure is of syndiotactic configuration, namely, the stereo-structure in which phenyl groups or substituted phenyl groups as side chains are located alternately at opposite direction relative to the main chain consisting of carbon-carbon bonds. In this case, the tacticity is quantitatively determined by the nuclear magnetic resonance method ($^{13}$C-NMR method) using carbon isotope. The tacticity as determined by $^{13}$C-NMR method can be denoted in terms of proportions of structural units continuously connected to each other, namely, a diad in which two structural units are connected to each other, a triad in which three structural units are connected to each other and a pentad in which five structural units are connected to each other. The styrenic polymers having such syndiotactic configuration as stated in the present invention usually means styrenic polymers or copolymers each having such a syndiotacticity as determined by $^{13}$C-NMR method that the proportion of racemic diad is at least 75%, preferably at least 85%, or the proportion of racemic pentad is at least 30%, preferably at least 50%.

Examples of such styrenic polymers or copolymers include polystyrene, poly(alkylstyrene), poly(halogenated styrene), poly(halogenated alkylstyrene), poly(alkoxystyrene), poly(vinyl benzoate), hydrogenated polymers thereof, the mixture thereof, and copolymers containing the polymers as main components.

Specific examples of the poly(alkylstyrene) include poly(methylstyrene), poly(ethylstyrene), poly(isopropylstyrene), poly(tert-butylstyrene), poly(phenylstyrene), poly(vinylnaphthalene) and poly(vinylstyrene). Examples of the poly(halogenated styrene) include poly(chlorostyrene), poly(bromostyrene) and poly(fluorostyrene). Examples of the poly(halogenated alkylstyrene) include poly(chloromethylstyrene). Examples of the poly(alkoxystyrene) include poly(methoxystyrene) and poly(ethoxystyrene). Of these are particularly preferable polystyrene, poly(p-methylstyrene), poly(m-methylstyrene), poly(tert-butylstyrene), poly(p-chlorostyrene), poly(m-chlorostyrene), poly(p-fluorostyrene), hydrogenated polystyrene and the copolymers containing the structural units thereof.

In regard to the process for producing the styrenic polymer having mainly syndiotactic configuration, a well known process is applicable thereto, for instance, a process described in Japanese Patent Application Laid-Open Nos.187708/1987 (Showa-62), wherein such styrenic polymer is produced by polymerizing a styrenic monomer in the presence or absence of a solvent such as an inert hydrocarbon by using a catalyst comprising a titanium compound and a condensation product of water and trialkylaluminum. In addition, the poly(halogenated alkylstyrene) and the hydrogenated polymers thereof can be produced by the process described, for instance, in Japanese Patent Application Laid-Open Nos.46912/1989 (Heisei-1) and 178505/1989 (Heisei-1).

The styrenic polymer having mainly syndiotactic configuration to be used as the component (B) of the molding material according to the present invention, which is obtainable in the above-mentioned manner, has a melting point of 245° C. or lower and a weight average molecular weight of at most 200,000. The weight average molecular weight is measured at 135° C. by gel permeation method using trichlorobenzene as a solvent.

The use of the polymer as the component (B) having a melting point of higher than 250° C. in an attempt to mold the mixture obtained by dry blend with the aforesaid atactic polystyrene as the component (A) at a molding temperature of ordinary atactic polystyrene, brings about deterioration in solvent resistance and mechanical strength due to insufficient mixing in a cylinder of a molding machine. Thus the polymer as the component (B) has a melting point of preferably 245° C. or lower.

Likewise, the use of the polymer as the component(B) having a weight average molecular weight of more than 200,000 in an attempt to mold the mixture obtained by dry blend with the aforesaid atactic polystyrene as the component (A) at a molding temperature of ordinary atactic polystyrene, brings about deterioration in solvent resistance and mechanical strength due to insufficient mixing in a cylinder of a molding machine.

Moreover, the preferably usable polymer as the component(B) is that having an initial relative crystallinity as measured with a differential scanning calorimeter being at most 60% preferably at most 50%, more preferably at most 40%. The use of the polymer as the component (B) having an initial relative crystallinity of at most 60% in an attempt to mold the mixture obtained by dry blend with the aforesaid atactic polystyrene as the component (A) at a molding temperature of ordinary atactic polystyrene, brings about improvement in melt characteristics for the molding material in a cylinder of a molding machine and besides, improvement in solvent resistance and mechanical strength for the moldings obtained, as compared with the polymer as the component (B) having an initial relative crystallinity of more than 60%.

In addition, there may be used the component (B) blended with any of rubbery components, other resins and additives. Specific examples of the rubbery components include diene based rubber such as styrene-butadiene copolymer and acrylonitrile-butadiene copolymer, non-diene based rubber such as ethylene-α-olefin copolymer, ethylene-α-olefin-polyene copolymer and polyacrylic ester, styrene-butadiene block copolymer (SB), styrene-butadiene-styrene block copolymer (SBS), styrene-isoprene block copolymer (SI), styrene-isoprene-styrene block copolymer (SIS), hydrogenated styrene-butadiene block copolymer (SEB), hydrogenated styrene-butadiene-styrene block copolymer (SEBS), ethylene-propylene elastomer, ethylene-graft-ethylene-propylene elastomer, ethylenic ionomer resin, hydrogenated styrene-isoprene block copolymer(SEP) and hydrogenated styrene-isoprene-styrene block copolymer (SEPS). Of these are particularly preferably used ethylene-α-olefin copolymer, SB, SBS, SI, SIS, SEBS and SEPS. Any of the above-exemplified rubbery elastomers may be used alone or in combination with at least one other.

With regard to the blending proportion of the atactic polystyrene as the component (A) and the styrenic polymer having mainly syndiotactic configuration as the component (B), the blend comprises 10 to 95%, preferably 20 to 95%, more preferably 50 to 85% by weight of the component (A), and 2 to 90% preferably 5 to 90%, more preferably 10 to 80%, particularly preferably 15 to 50% by weight of the component (B). When the blending proportion of the component (A) is more than 95% by weight or the blending proportion of the component (B) is less than 2% by weight, the molding obtained by molding the blend of the components (A) and (B) can not sufficiently manifest the effect on enhancing solvent resistance or mechanical strength of the molding thus obtained. On the other hand, the blending proportion of the component (A) is less than 10% by weight or the blending proportion of the component (B) is more than 90% by weight, the manufacturing cost is made disadvantageous.

The molding material according to the present invention, which comprises 10 to 95% by weight of the component (A) and 2 to 90% by weight of the component (B) as a basic constitution, may be blended with a proper amount of any of additives that are generally blended in a resin composition such as nucleating agent, plasticizer, mold release agent, antioxidant, flame retardant, flame retardant aid, dye, pigment and antistatic agent; thermoplastic resin; and rubber. Any of the additive, thermoplastic resin and rubber, when blended with the molding material, may be blended with the component (A) or (B) in advance or may be blended therewith simultaneously with the blending of the components (A) and (B).

The above-mentioned nucleating agent is added for the purpose of accelerating the crystallization of the styrenic polymer having mainly syndiotactic configuration, and enhancing the solvent resistance thereof. Examples of the nucleating agent include a metallic salt of a carboxylic acid such as aluminum di(p-t-butylbenzoate), a metallic salt of phosphoric acid such as methylenebis(2,4-di-butylphenol) sodium acid phosphate, talc and phthalocyanine derivatives, any of which may be used alone or in combination with at least one other.

Examples of the plasticizer include polyethylene glycol, polyamide oligomer, ethylenebisstearamide, phthalic esters, polystyrene oligomer, polyethylene wax, mineral oil and silicone oil, any of which may be used alone or in combination with at least one other.

Examples of the mold release agent include polyethylene wax, silicone oil, long chain carboxylic acids and metal salts of long chain carboxylic acids, any of which may be used alone or in combination with at least one other.

Examples of the antioxidant include a variety of compounds, from which well known compounds of phosphorus base, phenol base or sulfur base may be arbitrarily selected for use.

Examples of the flame retardant include brominated polymer such as brominated polystyrene, brominated syndiotactic polystyrene and brominated polyphenylene ether, brominated aromatic compounds such as brominated diphenylalkane and brominated diphenyl ether and phosphorus base flame retardant such as trichlene diphosphate, triphenyl phosphate and tris-3-chloropropyl phosphate, any of which may be selected for use. Examples of the flame retardant aid include antimony compounds such as antimony trioxide. The above-cited flame retardant and the like may be used alone or in combination with at least one other.

Examples of the thermoplastic resins include polyolefinic resins such as linear high density polyethylene, linear low density polyethylene, high pressure processed low density polyethylene, isotactic polypropylene, syndiotactic polypropylene, block polypropylene, random polypropylene, polybutene, 1,2-polybutadiene, cyclic polyolefin and poly-4-methylpentene; polystyrenic resins such as polystyrene, impact resistant polystyrene, ABS resin, AS resin and SMA resin; polyester based resin such as polycarbonate, polyethylene terephthalate and polybutylene terephthalate; polyamide based resin such as polyamide 6 and polyamide 6,6; polyarylene sulfide, any of which may be used alone or in combination with at least one other.

The molding material according to the present invention may be produced by compounding both the components (A) and (B), and at need, the above-mentioned various additives that are properly compounded and dry blending the compounded components. The machinery and equipment to be used for dry blending are not specifically limited, but there are usable a Henschel mixer, a ribbon mixer, a tumble mixer and the like.

The molding material thus obtained by dry blending, without being melt kneaded, can be supplied as such to a molding machine so that it is processed into a molding. Accordingly, one step in molding can be dispensed with, whereby the molding process is made economical, thus minimizing the degree of deterioration in the resin components accompanying the heat hysteresis.

The process for producing moldings by using the molding material according to the present invention is not specifically limited, but there are usable well known processes such as injection molding and extrusion molding. The resin temperature upon molding may be similar to a molding temperature of ordinary atactic polystyrene, and is 260° C. or lower, preferably 250° C. or lower. The molding temperature thereof higher than 260° C. causes deterioration in the productivity due to prolonged molding cycle and besides, unfavorably increases the sink at thick-walled portions of the molding thus obtained.

The fact that the molding material improved in solvent resistance and mechanical strength by being composed of the atactic polystyrene and syndiotactic polystyrene of the present invention can be molded at around a molding temperature of ordinary atactic polystyrene is attributable to the use, as the component (B) of the molding material, of the polystyrene which has mainly syndiotactic configuration, a melting point of 250° C. or lower and a weight average molecular weight of at most 200,000. As opposed to the foregoing, conventional well known styrenic resin compositions comprising atactic polystyrene and syndiotactic polystyrene have suffered from the disadvantage in that because of its melting point higher than 250° C. and a weight average molecular weight more than 200,000, the syndiotactic polystyrene requires a resin temperature upon molding of higher than 260° C., unfavorably increases the consumption of energy required for heating and cooling, prolongs the molding cycle, lowers productivity and besides unfavorably increases the sink at thick-walled portions of the molding thus obtained.

The moldings according to the present invention produced in the above-mentioned manner are excellent in solvent resistance and chemical resistance, are improved in mechanical properties such as impact strength and elongation, and accordingly are well suited for use in a variety of applications in wide range of industrial fields. Examples thereof as injection molded products include outer parts for automobiles such as radiator grill, grill, mark, back panel, door mirror, wheel cap, air spoiler and two-wheeled vehicle; inner parts for automobiles such as instrument panel, meter hood, pillar, glove box, console box, speaker box and lid; AV equipment such as housing, chassis, cassette case, CD magazine and remote control case; refrigerator parts such as lining, tray, arm, door cap and handle; vacuum cleaner parts such as housing, handle, pipe and suction port; air conditioner parts such as housing, fan and remote control case; electrical appliances and parts such as fan, ventilation fan, electric cleaner, parts for lighting equipment and battery case; parts for printer and copying machine such as housing, chassis, ribbon cassette and tray; personal computer parts such as housing, floppy disc shell and key board; housing, receiving set and mechanical chassis for telephone and communication equipment; general machinery and parts such as sewing machine, register, type writer, computer, optical instruments and musical instruments; toy and leisure goods such as remote control car, block, parts for pin ball machine stand, surfboard and helmet; sanitary products such as stool seat, stool seat cover, tank and shower; kitchenware such as lunch box, various vessels and pot; stationary; furniture; parts for building materials and house; and industrial structural materials such as pipe and tray.

Examples as extrusion molding products include basic materials for industry such as film, sheet, pipe and filament.

In the following, the present invention will be described in further detail with reference to comparative examples and working examples, which however shall not limit the present invention thereto.

EXAMPLES 1 TO 22

{1} Selection of the Component (A)

As the atactic polystyrene being the component (A) of the molding material according to the present invention, four types of styrenic resins and styrenic resin compositions (a-1) to (a-4) were selected as described hereunder:

(a-1) impact resistant styrenic resin (manufactured by Idemitsu Petrochemical Co., Ltd. under the trade name "IT-44")

(a-2) impact resistant styrenic resin (manufactured by Idemitsu Petrochemical Co., Ltd. under the trade name. "HT-52")

(a-3) resin composition consisting of 80% by weight of impact resistant styrenic resin (manufactured by Idemitsu Petrochemical Co., Ltd. under the trade name "IT-44") and 20% by weight of polyphenylene oxide resin(manufactured by Mitsubishi Engineering Co., Ltd. under the trade name "YPX-100L")

(a-4) resin composition consisting of 50% by weight of impact resistant styrenic resin (manufactured by Idemitsu Petrochemical Co., Ltd. under the trade name "IT-44") and 50% by weight of polyphenylene oxide resin(manufactured by Mitsubishi Engineering Co., Ltd. under the trade name "YPX-100L")

{2} Selection of the Component (B)

As the styrenic polymer having mainly syndiotactic configuration being the component (B) of the molding material according to the present invention, six types of styrenic resins (b-1) to (b-6) produced by the process described in Japanese Patent Application Laid-Open No.104818/1987 (Showa-62) were selected as given in Table 1:

TABLE 1

| Code | Resin composition | Weight-average molecular weight | Molecular weight distribution | Melting point (° C.) | Initial relative crystallinity (%) |
|---|---|---|---|---|---|
| (b-1) | St/p-Me* (12 mol %) | 195,000 | 2.2 | 241 | 60 |
| (b-2) | St/p-Me* (12 mol %) | 195,000 | 2.2 | 241 | 100 |
| (b-3) | St/p-Me* (20 mol %) | 180,000 | 2.5 | 230 | 40 |
| (b-4) | St/p-Me* (20 mol %) | 180,000 | 2.5 | 230 | 100 |
| (b-5) | St/p-Me* (20 mol %) | 100,000 | 2.7 | 228 | 50 |
| (b-6) | St/p-Me* (20 mol %) | 100,000 | 2.7 | 228 | 100 |

{Remarks} ① *St/p-Me; styrene/p-methylstyrene copolymer

② mol % in parenthesis in the column of Resin composition denotes the content ratio of p-methylstyrene ③ weight average molecular weight and molecular weight distribution (weight average molecular weight/number average molecular weight) were measured by gel permeation chromatography using 1,2,4-trichlorobezene as the solvent at 135° C. expressed in terms of polystyrene.

④ melting point was measured using a differential scanning calorimeter at a temperature raising rate of 20° C./minute from the melt peak position.

⑤ initial relative crystallinity was measured using a differential scanning calorimeter at a temperature raising rate of 20° C./minute, and was calculated from the following formula:

$$\text{Initial relative crystallinity (\%)} = \{(\Delta H_{TM} - \Delta H_{TCC})/\Delta H_{TM}\} \times 100$$

where $\Delta H_{TCC}$ (J/g) is absolute value of cold crystallization peak area per unit weight, and $\Delta H_{TM}$ (J/g) is absolute value of melt peak area per unit weight {3} Preparation of Dry Blend for the Components (A) and (B) and for Molding Therefrom The foregoing components (A) and (B) at blending proportions as listed in Table 2 were dry blended by the use of a Henschel mixer, and then injection molded at a mold temperature set to 40° C. to produce Izod test pieces, tensile test pieces, flexural test pieces and bar type test pieces of 1.6 mm in thickness for evaluating solvent resistance.

{4} Evaluation of Moldability and Mechanical Strength

In Table 2 are given the results of evaluations of the moldability upon injection molding in the foregoing item {3} in terms of the molding cycle by comparison in molding cycle between the molding of the component (A) alone and the molding of the components (A) and (B), in which the symbol marks shall have the following meanings:

① moldable in a comparable cooling time; ○

② cooling time needs to be prolonged by 1 to 5 seconds; Δ

③ cooling time needs to be prolonged by 5 seconds or longer; ×

In Table 2 are also given the results of evaluations of the sink upon injection molding in the foregoing item {3} in terms of the sink by comparison in sink between the molding of the component (A) alone and the molding of the components (A) and (B), in which the symbol marks shall have the following meanings:

① comparable by visual observation; ○

② somewhat sink is visually observed; Δ

③ clear sink is visually observed; ×

In Table 2 are also given the results of evaluations of the mechanical strength for the test pieces prepared in the foregoing item {3}, in which the Izod impact strength with notch was measured according to JIS-K 7110, and the tensile strength was measured according to JIS-K 7113

TABLE 2-1

| No. of Example | Component (A) Code | weight % | Component (B) Code | weight % | Molding temperature (cylinder), °C. |
|---|---|---|---|---|---|
| 1 | (a-1) | 70 | (b-1) | 30 | 260 |
| 2 | (a-1) | 70 | (b-1) | 30 | 250 |
| 3 | (a-1) | 70 | (b-1) | 30 | 245 |
| 4 | (a-1) | 90 | (b-3) | 10 | 245 |
| 5 | (a-1) | 70 | (b-3) | 30 | 245 |
| 6 | (a-1) | 50 | (b-3) | 50 | 245 |
| 7 | (a-1) | 30 | (b-3) | 70 | 245 |
| 8 | (a-1) | 70 | (b-5) | 30 | 245 |
| 9 | (a-2) | 70 | (b-5) | 30 | 245 |
| 10 | (a-3) | 70 | (b-5) | 30 | 245 |
| 11 | (a-4) | 70 | (b-5) | 30 | 245 |
| 12 | (a-1) | 70 | (b-5) | 30 | 235 |
| 13 | (a-2) | 70 | (b-5) | 30 | 235 |
| 14 | (a-3) | 70 | (b-5) | 30 | 235 |
| 15 | (a-4) | 70 | (b-5) | 30 | 235 |
| 16 | (a-1) | 70 | (b-2) | 30 | 260 |
| 17 | (a-1) | 70 | (b-2) | 30 | 250 |
| 18 | (a-1) | 70 | (b-2) | 30 | 245 |
| 19 | (a-1) | 70 | (b-4) | 30 | 245 |
| 20 | (a-2) | 70 | (b-6) | 30 | 245 |
| 21 | (a-3) | 70 | (b-6) | 30 | 235 |
| 22 | (a-4) | 70 | (b-6) | 30 | 235 |

TABLE 2-2

| No. of Example | Moldability Molding cycle | sink | Mechanical strength Impact strength (KJ/m$^2$) | Tensile elongation (%) |
|---|---|---|---|---|
| 1 | Δ | Δ | 8.6 | 24 |
| 2 | ○ | ○ | 8.5 | 23 |
| 3 | ○ | ○ | 8.5 | 21 |
| 4 | ○ | ○ | 9.0 | 25 |
| 5 | ○ | ○ | 8.9 | 24 |
| 6 | ○ | ○ | 8.9 | 16 |
| 7 | ○ | ○ | 7.3 | 12 |
| 8 | ○ | ○ | 8.5 | 23 |
| 9 | ○ | ○ | 12.0 | 30 |
| 10 | ○ | ○ | 10.0 | 26 |
| 11 | ○ | ○ | 11.0 | 28 |
| 12 | ○ | ○ | 8.2 | 21 |
| 13 | ○ | ○ | 11.0 | 23 |
| 14 | ○ | ○ | 10.4 | 28 |
| 15 | ○ | ○ | 11.6 | 30 |
| 16 | Δ | Δ | 8.3 | 21 |
| 17 | ○ | ○ | 8.2 | 20 |
| 18 | ○ | ○ | 8.0 | 18 |
| 19 | ○ | ○ | 8.4 | 21 |
| 20 | ○ | ○ | 11.5 | 26 |
| 21 | ○ | ○ | 9.6 | 24 |
| 22 | ○ | ○ | 10.5 | 25 |

{5} Evaluation of Solvent Resistance

The bar type test piece of 1.6 mm in thickness for evaluating solvent resistance was subjected to 0.5% strain. Thereafter a piece of gauze into which each of the undermentioned solvents had been soaked was placed on the strain portion of the test piece, covered with a wrapper to prevent the solvent from volatilizing, and then allowed to stand at 80° C. for 24 hours. Subsequently visual evaluation was made of the test piece for change in surface appearance and crack occurrence:

①: surfactant manufactured by Kao Corporation under the trade name "Magiclean"

②: surfactant manufactured by Shin-nichi Medico Co., Ltd. under the trade name "JET α for cleaning air conditioners.

③: gasoline manufactured by Idemitsu Kohsan Co.,Ltd. under the trade name "Idemitsu Superzeous"

④: plasticizer (dioctyl phthalate) manufactured by Tokyo Kasei Co.,Ltd.

⑤: machining oil manufactured by Nippon Oil Co.,Ltd. under the trade name "Unisolve EM"

Next, visual observation for change in surface appearance in the evaluation of solvent resistance was based on the following criteria. The results are wholly given in Table 3.

①: no change at all; ⊚

②: hardly changed; ○

③: occurrence of cloud or microcracks observed on surface; Δ

④: occurrence of roughness or cracks observed on surface; ×

⑤: occurrence of dissolution or large cracks observed on surface; ⨯

TABLE 3-1

| No. of Example | Component (A) Code | weight % | Component (B) Code | weight % | Solvent resistance surfactant A |
|---|---|---|---|---|---|
| 1 | (a-1) | 70 | (b-1) | 30 | ○ |
| 2 | (a-1) | 70 | (b-1) | 30 | ○ |
| 3 | (a-1) | 70 | (b-1) | 30 | ○ |
| 4 | (a-1) | 90 | (b-3) | 10 | ○ |
| 5 | (a-1) | 70 | (b-3) | 30 | ○ |
| 6 | (a-1) | 50 | (b-3) | 50 | ⊚ |
| 7 | (a-1) | 30 | (b-3) | 70 | ⊚ |
| 8 | (a-1) | 70 | (b-5) | 30 | ○ |
| 9 | (a-2) | 70 | (b-5) | 30 | ⊚ |
| 10 | (a-3) | 70 | (b-5) | 30 | ⊚ |
| 11 | (a-4) | 70 | (b-5) | 30 | ⊚ |
| 12 | (a-1) | 70 | (b-5) | 30 | ○ |
| 13 | (a-2) | 70 | (b-5) | 30 | ○ |
| 14 | (a-3) | 70 | (b-5) | 30 | ⊚ |
| 15 | (a-4) | 70 | (b-5) | 30 | ⊚ |
| 16 | (a-1) | 70 | (b-2) | 30 | ○ |
| 17 | (a-1) | 70 | (b-2) | 30 | ○ |
| 18 | (a-1) | 70 | (b-2) | 30 | ○ |
| 19 | (a-1) | 70 | (b-4) | 30 | ○ |
| 20 | (a-2) | 70 | (b-6) | 30 | ○ |
| 21 | (a-3) | 70 | (b-6) | 30 | ⊚ |
| 22 | (a-4) | 70 | (b-6) | 30 | ⊚ |

TABLE 3-2

| No. of Example | Solvent resistance Surfactant B | Gasoline | Plasticizer | Machining oil |
|---|---|---|---|---|
| 1 | ○ | ○ | ○ | ○ |
| 2 | ○ | ○ | ○ | ○ |
| 3 | ○ | ○ | ○ | ○ |
| 4 | Δ | Δ | Δ | Δ |
| 5 | ○ | ○ | ○ | ○ |
| 6 | ○ | ○ | ○ | ○ |

TABLE 3-2-continued

| No. of Example | Solvent resistance | | | |
|---|---|---|---|---|
| | Surfactant B | Gasoline | Plasticizer | Machining oil |
| 7 | ○ | ○ | ○ | ○ |
| 8 | ○ | ○ | ○ | ○ |
| 9 | ○ | ○ | ○ | ○ |
| 10 | ○ | ⊙ | ○ | ○ |
| 11 | ○ | ⊙ | ○ | ○ |
| 12 | ○ | ○ | ○ | ○ |
| 13 | ○ | ○ | ○ | ○ |
| 14 | ○ | ⊙ | ○ | ○ |
| 15 | ○ | ⊙ | ○ | ○ |
| 16 | ○ | ○ | ○ | ○ |
| 17 | ○ | ○ | ○ | ○ |
| 18 | ○ | ○ | ○ | ○ |
| 19 | ○ | ○ | ○ | ○ |
| 20 | ○ | ○ | ○ | ○ |
| 21 | ○ | ⊙ | ○ | ○ |
| 22 | ○ | ⊙ | ○ | ○ |

Comparative Examples 1 to 22

{7} Selection of the Component (A)

As the atactic polystyrene being the component (A), four types of styrenic resins and styrenic resin compositions (a-1) to (a-4) were selected as is the case with Example 1.

{2} Selection of the Component (B)

Styrenic polymers which had mainly syndiotactic configuration, but which had such physical properties that fail to meet the specification of the component (B) according to the present invention were selected in seven types. In Table 4 are given the seven types of such styrenic resin as (c-1) to (c-7)

TABLE 4

| Code | Resin composition | Weight-average molecular weight | Molecular weight distribution | Melting point (° C.) | Initial relative crystallinity (%) |
|---|---|---|---|---|---|
| (c-1) | Styrenic homopolymer | 150,000 | 2.4 | 270 | 60 |
| (c-2) | St/p-Me* (7 mol %) | 250,000 | 2.3 | 247 | 55 |
| (c-3) | St/p-Me* (7 mol %) | 180,000 | 2.5 | 247 | 53 |
| (c-4) | St/p-Me* (12 mol %) | 250,000 | 2.3 | 242 | 48 |
| (c-5) | St/p-Me* (12 mol %) | 330,000 | 2.2 | 242 | 40 |
| (c-6) | St/p-Me* (20 mol %) | 250,000 | 2.4 | 230 | 40 |
| (c-7) | St/p-Me* (20 mol %) | 350,000 | 2.2 | 230 | 38 |

{3} Preparation of Dry Blend for the Components (A) and (C) and for Molding Therefrom The foregoing components (A) and (C) at blending proportions as listed in Table 5 were dry blended by the use of a Henschel mixer, and then injection molded at a mold temperature set to 40° C. to produce test pieces same as in Example 1.

{4} Evaluation of Moldability and Mechanical Strength

Evaluations were made of the moldability and mechanical strength by the use of each of the test pieces obtained in the preceding item {3} in the same manner as in Example 1. The results are given in Table 5.

TABLE 5-1

| No. of Comp. Example | Component (A) | | Component (C) | | Molding temperature (cylinder), ° C. |
|---|---|---|---|---|---|
| | Code | weight % | Code | weight % | |
| 1 | (a-1) | 100 | — | 0 | 245 |
| 2 | (a-2) | 100 | — | 0 | 245 |
| 3 | (a-3) | 100 | — | 0 | 245 |
| 4 | (a-4) | 100 | — | 0 | 245 |
| 5 | (a-1) | 90 | (c-1) | 10 | 245 |
| 6 | (a-1) | 70 | (c-1) | 30 | 245 |
| 7 | (a-1) | 50 | (c-1) | 50 | 245 |
| 8 | (a-1) | 30 | (c-1) | 70 | 245 |
| 9 | (a-1) | 70 | (c-1) | 30 | 250 |
| 10 | (a-1) | 70 | (c-1) | 30 | 260 |
| 11 | (a-1) | 70 | (c-1) | 30 | 270 |
| 12 | (a-1) | 70 | (c-1) | 30 | 280 |
| 13 | (a-1) | 70 | (c-2) | 30 | 245 |
| 14 | (a-1) | 70 | (c-3) | 30 | 245 |
| 15 | (a-1) | 70 | (c-4) | 30 | 245 |
| 16 | (a-1) | 70 | (c-5) | 30 | 245 |
| 17 | (a-1) | 70 | (c-6) | 30 | 245 |
| 18 | (a-1) | 70 | (c-7) | 30 | 245 |
| 19 | (a-1) | 70 | (c-7) | 30 | 250 |
| 20 | (a-1) | 70 | (c-7) | 30 | 260 |
| 21 | (a-1) | 70 | (c-7) | 30 | 270 |
| 22 | (a-1) | 70 | (c-7) | 30 | 280 |

TABLE 5-2

| No. of Comp. Example | Moldability | | Mechanical strength | |
|---|---|---|---|---|
| | Molding cycle | sink | Impact strength (KJ/m$^2$) | Tensile elongation (%) |
| 1 | ○ | ○ | 9.0 | 25 |
| 2 | ○ | ○ | 12.0 | 30 |
| 3 | ○ | ○ | 10.8 | 28 |
| 4 | ○ | ○ | 12.2 | 32 |
| 5 | ○ | ○ | 5.0 | 4 |
| 6 | ○ | ○ | 4.3 | 2 |
| 7 | ○ | ○ | 4.0 | 2 |
| 8 | ○ | ○ | 3.5 | 2 |
| 9 | ○ | ○ | 3.7 | 2 |
| 10 | Δ | Δ | 3.8 | 3 |
| 11 | X | X | 4.0 | 5 |
| 12 | X | X | 7.5 | 20 |
| 13 | ○ | ○ | 5.0 | 3 |
| 14 | ○ | ○ | 5.5 | 5 |
| 15 | ○ | ○ | 6.3 | 6 |
| 16 | ○ | ○ | 6.0 | 5 |
| 17 | ○ | ○ | 6.9 | 7 |
| 18 | ○ | ○ | 6.5 | 6 |
| 19 | ○ | ○ | 7.0 | 7 |
| 20 | Δ | Δ | 7.2 | 8 |
| 21 | X | X | 7.8 | 15 |
| 22 | X | X | 8.0 | 20 |

{5} Evaluation of Solvent Resistance

By the use of the bar type test pieces prepared in the preceding item (3), evaluations were made of solvent resistance of the test pieces in the same manner as in Example 1. The results are given in Table 6.

TABLE 6-1

| No. of Comp. Example | Component (A) | | Component (B) | | Solvent resistance surfactant A |
|---|---|---|---|---|---|
| | Code | weight % | Code | weight % | |
| 1 | (a-1) | 100 | — | 0 | X |
| 2 | (a-2) | 100 | — | 0 | X |

TABLE 6-1-continued

| No. of Comp. Example | Component (A) Code | weight % | Component (B) Code | weight % | Solvent resistance surfactant A |
|---|---|---|---|---|---|
| 3 | (a-3) | 100 | — | 0 | X |
| 4 | (a-4) | 100 | — | 0 | X |
| 5 | (a-1) | 90 | (c-1) | 10 | X |
| 6 | (a-1) | 70 | (c-1) | 30 | X |
| 7 | (a-1) | 50 | (c-1) | 50 | X |
| 8 | (a-1) | 30 | (c-1) | 70 | X |
| 9 | (a-1) | 70 | (c-1) | 30 | X |
| 10 | (a-1) | 70 | (c-1) | 30 | Δ |
| 11 | (a-1) | 70 | (c-1) | 30 | ○ |
| 12 | (a-1) | 70 | (c-1) | 30 | ⊚ |
| 13 | (a-1) | 70 | (c-2) | 30 | X |
| 14 | (a-1) | 70 | (c-3) | 30 | Δ |
| 15 | (a-1) | 70 | (c-4) | 30 | Δ |
| 16 | (a-1) | 70 | (c-5) | 30 | Δ |
| 17 | (a-1) | 70 | (c-6) | 30 | ○ |
| 18 | (a-1) | 70 | (c-7) | 30 | X |
| 19 | (a-1) | 70 | (c-7) | 30 | Δ |
| 20 | (a-1) | 70 | (c-7) | 30 | Δ |
| 21 | (a-1) | 70 | (c-7) | 30 | ○ |
| 22 | (a-1) | 70 | (c-7) | 30 | ○ |

TABLE 6-2

| No. of Comp. Example | Solvent resistance | | | |
|---|---|---|---|---|
| | Surfactant B | Gasoline | Plasticizer | Machining oil |
| 1 | X | X | X | X |
| 2 | X | X | X | X |
| 3 | X | X | X | X |
| 4 | X | X | X | X |
| 5 | X | X | X | X |
| 6 | X | X | X | X |
| 7 | X | X | X | X |
| 8 | X | X | X | X |
| 9 | X | X | X | X |
| 10 | X | X | X | X |
| 11 | Δ | Δ | Δ | Δ |
| 12 | ○ | ○ | ○ | ○ |
| 13 | X | X | X | X |
| 14 | X | X | X | X |
| 15 | Δ | Δ | Δ | Δ |
| 16 | X | X | X | X |
| 17 | Δ | Δ | Δ | Δ |
| 18 | X | X | X | X |
| 19 | Δ | Δ | Δ | Δ |
| 20 | Δ | Δ | Δ | Δ |
| 21 | ○ | ○ | ○ | ○ |
| 22 | ○ | ○ | ○ | ○ |

Evaluations were made of the test pieces prepared in the under-mentioned Examples 23 to 31 and Comparative Examples 23 to 26 by the following methods.

{Evaluation Method}

(1) External Appearance

By observing the test pieces, evaluations were made on the basis of the following criteria.

○: uniform in whole
Δ: somewhat non-uniform
x: non-uniform or unmelted SPS observed (2) Impact Resistance Impact resistance with notch was determined in accordance with JIS K 7110.

(3) Chemical Resistance

Detergent
(a) Jet α for air conditioner cleaning (manufactured by in Shin-nichi Medico Co.,Ltd.)
(b) antimicrobial air conditioner cleaner (manufactured by King Chemical Co.,Ltd.)
(c) potent air conditioner cleaner (manufactured by Kimura Soap Co.,Ltd.)
(d) air conditioner cleaning spray (manufactured by Earth Seiyaku Co.,Ltd.)
(e) power bath cleaning spray (manufactured by S.T. Chemical Co.,Ltd.)
(f) Magic Clean (manufactured by Kao Corporation)

Cosmetics
(g) Biore Make Cleaner (manufactured by Kao Corporation)
(h) Sophyna Moist Cleansing (manufactured by Kao Corporation)
(i) Sophyna UV Protector (manufactured by Kao Corporation)

A flexural test piece for evaluating solvent resistance was subjected to annealing at 80° C. for 48 hours and then to 1% strain. Thereafter a piece of gauze into which each of the above mentioned chemicals had been soaked was placed on the strain portion of the test piece, and then allowed to stand at room temperature for 24 hours. Subsequently visual evaluation was made of the test piece for surface roughness and/or cracks occurrence on the basis of the following criteria:

⊚: no change at all
○: slight surface roughness or cracks observed
Δ: surface roughness or cracks observed
x: dissolved or destroyed {Material Used}

(A) Component (Rubber Modified Styrenic Polymer)

High impact polystyrene (HIPS) manufactured by Idemitsu Petrochemical Co.,Ltd.

(B) Component (SPS)

In the following, weight average molecular weight and molecular weight distribution were measured by gel permeation chromatography (GPC) using 1,2,4-trichlorobezene as the solvent at 130° C. Melting point was measured using a differential scanning calorimeter at a temperature raising rate of 20° C./minute from the melt peak position. Each SPS was produced by a well known method.

① SPS1: styrene/p-methylstyrene copolymer (p-methylstyrene content of 14 mol %), weight average molecular weight=180,000, Mw/Mn=2.3, melting point=237° C.

② SPS2: SPS1/G1651=80/20% by weight G1951: SEBS manufactured by Shell Chemical Co.,Ltd. under the trade name "Krayton G1651"

③ SPS3: SPS1/ENGAGE 8150/Septon 2104=80/16/4% by weight ENGAGE 8150: ethylene/α-olefin copolymer manufactured by Du Pont-Dow Elastomer Corporation Septon 2104: SEPS manufactured by Kuraray Co., Ltd.

④ SPS4: weight average molecular weight=300,000, Mw/Mn=2.5, melting point=270° C.

EXAMPLE 23

A mixture which had been prepared by dry mixing 95% by weight of high impact polystyrene (HIPS) (manufactured by Idemitsu Petrochemical Co.,Ltd. under the trade name "HT56") as the the component (A) and 5% by weight of syndiotactic polystyrene (SPS1) as the component (B), was injection molded at a resin temperature (molding temperature) of 250° C. and a mold temperature of 60° C. to prepare Izod test pieces and flexural test pieces. By the use of the test pieces thus obtained observation and measurement were made of the appearance, Izod impact strength and chemical resistance in accordance with the above-mentioned procedures in (1) to (3). The results are given in Table 7.

EXAMPLES 24 TO 31

Comparative Examples 23 to 26

The procedure in Example 23 was repeated to prepare test pieces except that the composition of the components and molding temperature were each set to the values as given in Table 7. By the use of the test pieces thus obtained observation and measurement were made of the appearance, Izod impact strength and chemical resistance (detergent resistance and solvent resistance) in accordance with the above-mentioned procedure in (1) to (3). The results are given in Table 7.

TABLE 7-1

| | No. of Example | | | | | | |
|---|---|---|---|---|---|---|---|
| | 23 | 24 | 25 | 26 | 27 | 28 | 29 |
| Composition of Component | | | | | | | |
| (A) HIPS (wt. %) | 95 | 80 | 50 | 95 | 80 | 50 | 95 |
| (B) SPS1 (wt. %) | 5 | 20 | 50 | | | | |
| (B) SPS2 (wt. %) | | | | 5 | 20 | 50 | |
| (B) SPS3 (wt. %) | | | | | | | 5 |
| (B) SPS4 (wt. %) | | | | | | | |
| Molding Temperature, ° C. | 250 | 250 | 250 | 250 | 250 | 250 | 250 |
| Appearance | ○ | ○ | ○ | ○ | ○ | ○ | ○ |
| Izod Impact Strength (KJ/m²) | 10 | 10 | 9 | 10 | 12 | 13 | 10 |
| Chemical Resistance | | | | | | | |
| (a) | Δ | ○ | ◎ | Δ | ◎ | ◎ | Δ |
| (b) | Δ | ○ | ◎ | Δ | ◎ | ◎ | Δ |
| (c) | Δ | ○ | ◎ | Δ | ○ | ◎ | Δ |
| (d) | Δ | ○ | ◎ | Δ | ○ | ◎ | Δ |
| (e) | Δ | ○ | ◎ | Δ | ○ | ◎ | Δ |
| (f) | Δ | ○ | ○ | Δ | ○ | ○ | Δ |
| (g) | Δ | ○ | ◎ | Δ | ◎ | ◎ | Δ |
| (h) | Δ | ○ | ○ | Δ | ○ | ○ | Δ |
| (i) | x | Δ | Δ | x | Δ | ○ | x |

TABLE 7-2

| | No. of Comp. Example | | | |
|---|---|---|---|---|
| | 23 | 24 | 25 | 26 |
| Composition of Component | | | | |
| (A) HIPS (wt. %) | 100 | 95 | 80 | 50 |
| (B) SPS1 (wt. %) | | | | |
| (B) SPS2 (wt. %) | | | | |
| (B) SPS3 (wt. %) | | | | |
| (B) SPS4 (wt. %) | | 5 | 20 | 50 |
| Molding Temperature, ° C. | 220 | 250 | 250 | 250 |
| Appearance | ○ | Δ | X | X |
| Izod Impact Strength (KJ/m²) | 9 | 6 | 4 | 2 |

TABLE 7-2-continued

| | No. of Comp. Example | | | |
|---|---|---|---|---|
| | 23 | 24 | 25 | 26 |
| Chemical Resistance | | | | |
| (a) | X | X | X | X |
| (b) | X | X | X | X |
| (c) | X | X | X | X |
| (d) | X | X | X | X |
| (e) | X | X | X | X |
| (f) | X | X | X | X |
| (g) | X | X | X | X |
| (h) | X | X | X | X |
| (i) | X | X | X | X |

As demonstrated in Table 7, when compared with the moldings of Comparative Examples 23 to 26, the moldings of Examples 23 to 31 are excellent in not only appearance and impact resistance but also in chemical resistance.

INDUSTRIAL APPLICABILITY

According to the molding material of the present invention, it is made possible not only to immediately supply a molding machine with a dry blend of the molding material as such, dispensing with a melt kneading step, but also to carry out molding at a molding temperature almost same as that of ordinary atactic polystyrene. Consequently, the molding material enables to shorten the period of time required for molding, thus enhance productivity and besides curtail energy consumption required therefor. Moreover, the moldings produced thereby are excellent in solvent resistance as well as mechanical properties such as impact strength and tensile elongation.

What is claimed is:

1. A molding material, comprising a dry blend of 10 to 95% by weight of a (A) styrenic polymer having atactic configuration and 2 to 90% by weight of a (B) styrenic polymer having a melting point of 250° C. or lower, a weight average molecular weight of at most 200,000 and mainly syndiotactic configuration wherein the styrenic polymer having mainly syndiotactic configuration as the component (B) has an initial relative crystallinity as measured with a differential scanning calorimeter being at most 60%.

2. A process for producing a molding comprising molding a molding material at a resin temperature of 260° C. at the highest, wherein the molding material comprises a dry blend of 10 to 95% by weight of a (A) styrenic polymer having atactic configuration and 2 to 90% by weight of a (B) styrenic polymer having a melting point of 250° C. or lower, a weight average molecular weight of at most 200,000 and mainly syndiotactic configuration and the styrenic polymer having mainly syndiotactic configuration as the component (B) has an initial relative crystallinity as measured with a differential scanning calorimeter being at most 60%.

3. A molding produced by the process according to claim 2.

* * * * *